US012354296B2

(12) United States Patent
Steiner et al.

(10) Patent No.: US 12,354,296 B2
(45) Date of Patent: Jul. 8, 2025

(54) RETAIL COMPUTER VISION SYSTEM FOR SENSORY IMPAIRED

(71) Applicant: Toshiba Global Commerce Solutions, Inc., Durham, NC (US)

(72) Inventors: David J. Steiner, Durham, NC (US); Suzanne M. Bleakley, Cary, NC (US); Andrei Khaitas, Durham, NC (US); Evgeny Shevtsov, Durham, NC (US)

(73) Assignee: Toshiba Global Commerce Solutions, Inc.

( * ) Notice: Subject to any disclaimer, the term of this patent is extended or adjusted under 35 U.S.C. 154(b) by 365 days.

(21) Appl. No.: 17/710,568

(22) Filed: Mar. 31, 2022

(65) Prior Publication Data

US 2023/0316557 A1 Oct. 5, 2023

(51) Int. Cl.
| | |
|---|---|
| *G06T 7/70* | (2017.01) |
| *G06T 7/20* | (2017.01) |
| *G06V 10/82* | (2022.01) |
| *G06V 20/52* | (2022.01) |
| *H04N 7/18* | (2006.01) |
| *H04N 23/90* | (2023.01) |

(52) U.S. Cl.
CPC .................. *G06T 7/70* (2017.01); *G06T 7/20* (2013.01); *G06V 10/82* (2022.01); *G06V 20/52* (2022.01); *H04N 7/181* (2013.01); *H04N 23/90* (2023.01); *G06T 2207/10016* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2015/0339951 A1* | 11/2015 | Stevens | G09B 21/008 348/62 |
| 2017/0254646 A1* | 9/2017 | Lee | H04W 4/02 |
| 2020/0124437 A1* | 4/2020 | Miyake | G01C 21/3644 |
| 2020/0302510 A1* | 9/2020 | Chachek | G06Q 30/0639 |

(Continued)

OTHER PUBLICATIONS

Foo, "Grocery Shopping Assistant for the Blind/Visually Impaired", GroZi, 2009 (32 pages).

(Continued)

*Primary Examiner* — James M Anderson, II
(74) *Attorney, Agent, or Firm* — Kaufman & Canoles P.C.

(57) ABSTRACT

Systems and methods of providing navigation information associated with a retail space are provided. In one exemplary embodiment, a method comprises, a network node operationally coupled to a set of optical sensor devices positioned throughout a retail space, the network node receiving a sequence of images from each optical sensor device. The method comprises, obtaining a current position of a certain subject in the retail space based on one or more sequence of images received. The method comprises, obtaining a current position of an obstacle in the retail space based on one or more sequence of images received. The method comprises, sending to a wireless device associated with the certain subject, navigation information associated with the current positions of the certain subject and the obstacle in the retail space.

21 Claims, 10 Drawing Sheets

(56) References Cited

U.S. PATENT DOCUMENTS

2023/0099791 A1* 3/2023 Ghosh .................... G06V 20/58
　　　　　　　　　　　　　　　　　　　　　　　　　　701/428

OTHER PUBLICATIONS

Mirabella, "Visually impaired customers can use app to grocery shop at Wegmans," The Baltimore Sun, Published Sep. 12, 2018 (8 pages).

Zientara, et al., "Third Eye: A Shopping Assistant for the Visually Impaired," IEEE Computer Society, Published Feb. 2017 (pp. 16-24).

* cited by examiner

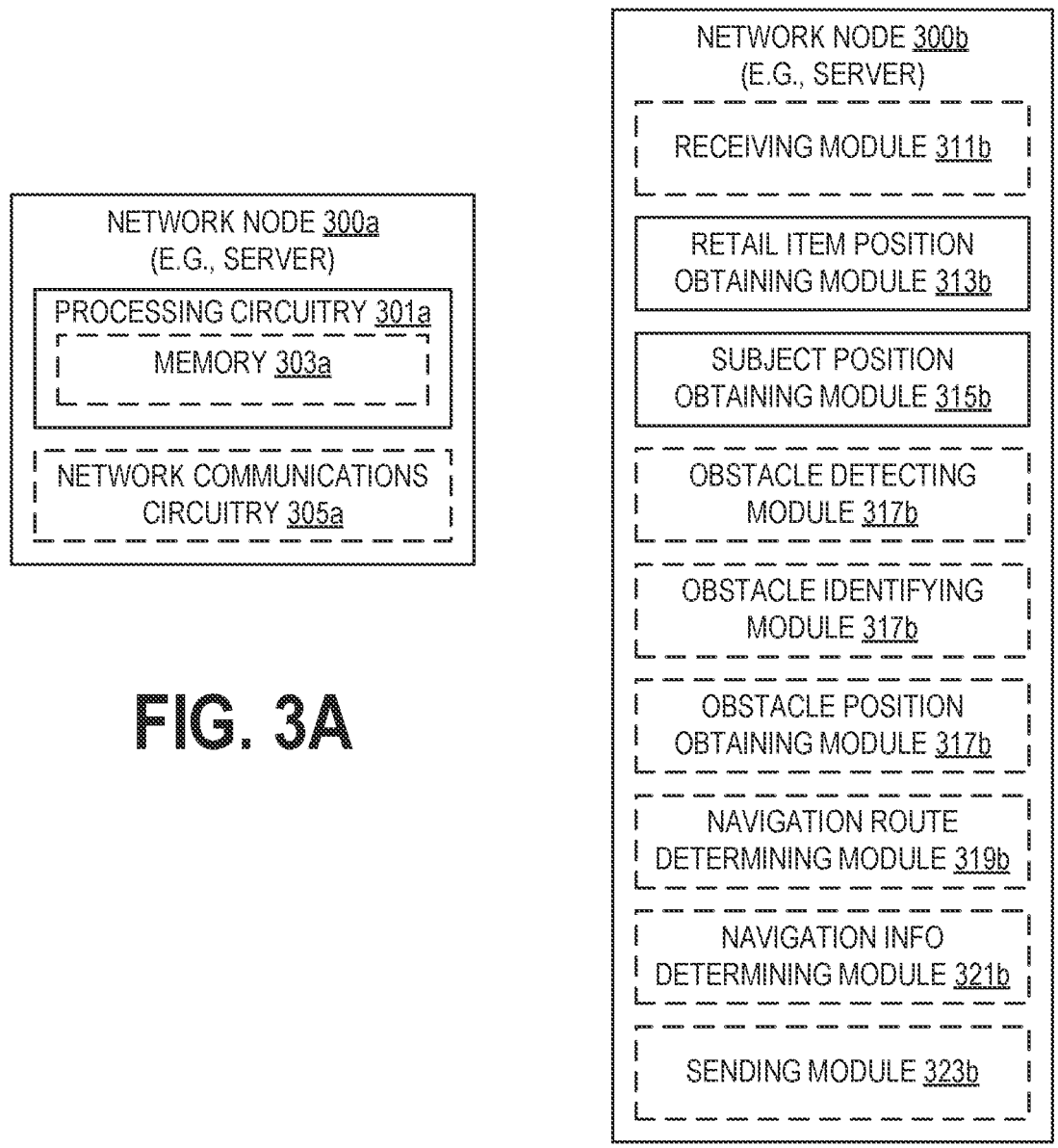

RETAIL COMPUTER VISION SYSTEM FOR SENSORY IMPAIRED

BACKGROUND

Computer vision technology enables computers and systems to derive meaningful information from digital images, videos, and other visual inputs. The computers and systems can take actions or make recommendations based on that information. Computer vision is used in industries ranging from energy and utilities to manufacturing and automotive, with computer visions use continuing to grow.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIGS. 3A-B illustrate other embodiments of a network node in accordance with various aspects as described herein.

DETAILED DESCRIPTION

Figure 1:
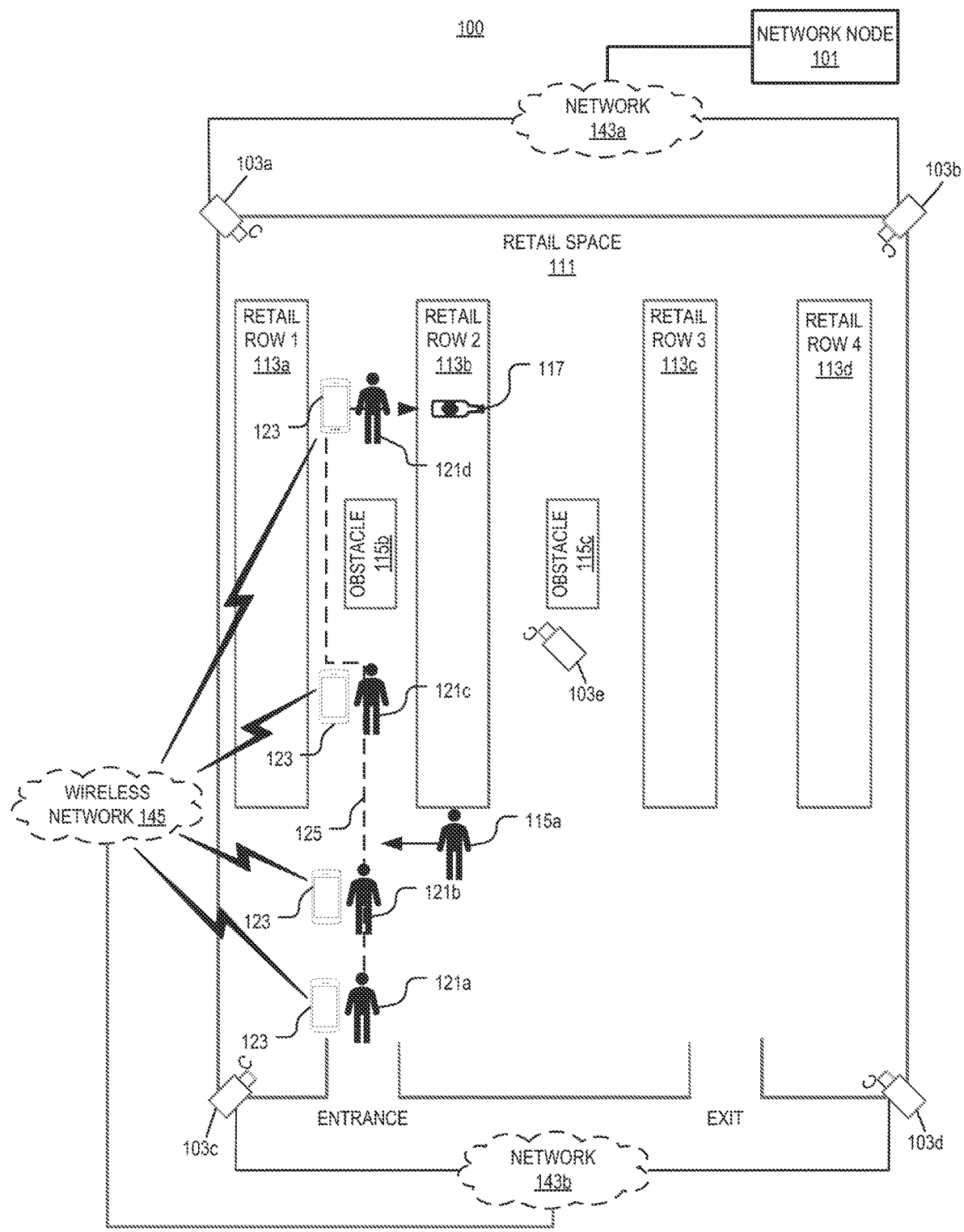
FIG. 1 illustrates one embodiment of a system that assists sensory impaired individuals in a retail environment in accordance with various aspects as described herein.

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Retailers are beginning to install computer vision systems in their retail spaces. These systems can track customers, recognize retail items, and generate retail transactions. As disclosed herein, a retailer's computer vision system can also be leveraged to improve a customer's in-store experience, including for a sensory impaired customer (e.g., hearing impairment, visual impairment). In one embodiment, a retailer's application executed on a customer's smartphone can interface to the retail store's computer vision system so as to provide various forms of in-store assistance to that customer. The in-store assistance can include the system providing real-time navigation information through the smartphone application in the form of visual information displayed on the smartphone's display, audio output from the smartphone's speaker or coupled headphones, or haptic feedback generated by the smartphone. The system can also determine the navigation information based on a single retail item or a shopping list of retail items requested by the customer through the smartphone application.

The computer vision system can determine a navigation route (e.g., minimal distance path, minimal obstruction path) through the retail space for the single retail item or the shopping list. Based on this route, the system can indicate, to the customer via the smartphone application, the navigation information such as when to turn, direction to move, impending obstructions (e.g., retail shelves, retail displays, other customers, shopping carts, restocking pallets, retail item spills), and the like. In one example, a customer can indicate to the smartphone application that the customer requests ketchup. The system receives an indication of this request and in response, determines an in-store navigation route from the customer's current position to the ketchup located on a store shelf. The system can then provide real-time navigation information to the customer through the smartphone application while the customer is moving in the retail space. For an obstacle in or near a path of the customer, the system can provide real-time navigation information to enable the customer to avoid the obstacle.

The computer vision system can provide other forms of in-store assistance through the smartphone application such as: (i) information (e.g., price, weight, serving size, calories per serving size, nutrition information, expiration date, ripeness, harvested date) of a retail item requested or obtained by the customer; (ii) advertising information (e.g., sales coupons); (iii) competitive retail product information; and (iv) pick-up status of orders of prepared retail items (e.g., deli products). Other features provided by the computer vision system, the smartphone application or both can include: (i) informing the customer about their current in-store location, including automatically informing at predefined time or distance intervals; (ii) notification of an in-store point of interest (e.g., sale or discounted retail items, entering vegetable section) as a customer approaches that point of interest; (iii) simulation of moving about a retail space before visiting that retail space; three dimensional sound localization through headphones coupled to a customer's smartphone so that the customer can hear the in-store assistance in the relevant direction; and (iv) requesting in-store assistance from a store representative with the in-store location of the customer being sent by the system to an assigned store representative's smartphone.

Furthermore, computer vision systems have been a beneficial methodology for assisting individuals with visual impairments. The methodologies include applying real-time on-device image recognition to identify and detect objects, which expands the ability for visually impaired individuals to participate in commerce. As such, a wearable computer vision device has been shown to reduce collisions. However, issues arise in using computer vision technology to assist sensory impaired individuals to navigate a retail space. For example, a wearable computer vision device is limited to a field of view of a local sensing device of the wearable computer vision device. Accordingly, there is a need for improved techniques for utilizing computing devices of visually impaired individuals with computer vision capabilities to assist in navigation of a retail space. To resolve, in one exemplary embodiment, a navigational solution for a retail space leverages a retailer's computer vision system to assist visually impaired individuals via a client application. The navigational solution provides navigation information to an individual in the retail space based on sequences of images captured by one or more cameras in the retail space that are operationally coupled to the computer vision system. The navigation solution provides navigation information to the individual related to dynamic obstacles in the retail space by leveraging tracking information of the computer vision system.

Various embodiments of the present disclosure include a network node (e.g., server) that is operationally coupled to a set of optical sensor devices (e.g., cameras) positioned throughout a retail space. The network node is configured to receive the captured images from each optical sensor device and then process such images to determine (among other things) current positions of subjects and obstacles in the retail space. The network node is also configured to send, to a wireless device operated by a certain subject, an indication that provides navigation information associated with the retail space based on a current position of the certain subject and a current position of an obstacle in the retail space. Additionally, embodiments of the present disclosure recognize that challenges exist in providing navigation information related to dynamic obstacles (e.g., moving customers, displaced retail infrastructure component) in a retail space. The challenges providing navigation information exist because information related to dynamic obstacles may not be readily apparent to a wearable computer vision device due to the limited field of view or insufficient processing capability of the wearable device to detect dynamic obstacles in real-time. In addition, other desirable features and characteristics of the present disclosure will become apparent from the subsequent detailed description and embodiments, taken in conjunction with the accompanying figures and the foregoing technical field and background.

In the present disclosure, systems and methods of assisting sensory impaired individuals via a client application using a computer vision system are provided. In one example, FIG. 1 illustrates an example of a retail environment 100 having a retail space 111 that includes subjects (e.g., customers), obstacles 115a-c (e.g., retail display, customer, hazard), and retail shelves 113a-d having retail items 117. In one example, a hazard can include a permanent or temporary condition in the retail space 111 that could cause a customer to slip, trip, or fall. In another example, a hazard can include retail items that have fallen off a retail shelf 113a-e. In yet another example, a hazard can be a shopping cart, a palette, a palette jack or a forklift in the retail space 111. The environment 100 also includes a network node 101 (e.g., server) that is operationally coupled over a network 143a-b (e.g., WiFi, Ethernet, Internet) to a set of optical sensor devices 103a-e. Each optical sensor device 103a-e has an optical sensor (e.g., camera) with a viewing angle or field of view towards a certain physical area or region of the retail space 111. In some implementations, each optical sensor device 103a-e is configured to send images, camera configuration information, and device parameters to the network node 101. Further, each optical sensor is configured to capture sequences of images. A sequence of images can be one or more contiguous images. The network 143a, the network 143b, the wireless network 145 may be the same network or networks or different network or networks.

In operation, the subject 121 carries a wireless device 123 that is operationally coupled to the network node 101 over a wireless network 145 (e.g., cellular, WiFi, Bluetooth). While the subject is at or approaching position 121a in the retail space 111, the subject sends a request, from the wireless device 123 (such as from a client application executable on the wireless device 123 having a user account that is linked to the client application), to the network node 101 over a wireless communication channel, an indication that requests navigation information associated with a certain retail item 117 (e.g., ketchup) in the retail space 111. In response, the network node 101 obtains the current position 121a of the subject in the retail space 111 based on a sequence of images received from at least one optical sensor device 103a-e that has a viewing angle towards the subject at position 121a. Further, the network node 101 obtains a current position of the certain retail item 117 in the retail space 111 based on a predetermined position of that retail item 117 in the retail space 111 (e.g., map or floorplan of retail items on each retail shelf 113a-d in the retail space 111) or a sequence of images received by the network node 101 from at least one optical sensor device 103a-e that has a viewing angle towards that certain retail item 117. The network node 101 then determines a navigation route 125 in the retail space 111 from the current position 121a of the subject to the current position of the certain retail item 117 based on the current position 121a of the certain subject, the current position of the certain retail item 117, or a map or floorplan of the retail space 111. The network node 101 sends, to the wireless device 123 over the wireless communication channel, navigation information associated with the navigation route 125. Further, the network node 101 may send the navigation information at predefined time or distance intervals along the navigation route 125. In some implementations, the network node 101 can utilize the predefined time or distance intervals to determine whether the subject 121 is trapped or not following the navigation information provided and send a notification to personnel to assist the subject 121. The navigation information may include information associated with the subject moving along the navigation route 125 such as an indication to stop, start, turn, yield, increase or reduce gait or speed, or the like.

While the certain subject is at or approaching position 121b along the navigation route 125, the network node 101 detects an obstacle 115a (e.g., person) based on the position 121b of the subject, the navigation route 125, or a sequence of images received from at least one optical sensor device 103a-e that has a viewing angle towards the obstacle 115a. In response to detecting the obstacle 115a, the network node 101 obtains the current position of the obstacle 115a based on a sequence of images received from the at least one optical sensor device 103a-e that has the viewing angle towards the obstacle 115a. The network node 101 then determines navigation information associated with the obstacle 115a based on current or next positions of the subject or the obstacle 115a, or the navigation route 125. The network node 101 sends, to the wireless device 123 over the wireless communication channel, navigation information associated with the obstacle 115a such as an indication associated with a person approaching the subject. Further, the navigation information may include information to enable the subject to avoid the obstacle such as an indication to stop, start, turn, yield, increase or reduce gait or speed, or the like. In addition, the navigation information may include information specific to the obstacle 115a such as a type of obstacle (e.g., person).

While the certain subject is at or approaching position 121c along the navigation route 125, the network node 101 detects an obstacle 115b (e.g., hazard) based on the current position 121c of the subject, the navigation route 125, or a sequence of images received from at least one optical sensor device 103a-e that has a viewing angle towards the obstacle 115b. In response to detecting the obstacle 115b, the network node 101 obtains a current position 121c of the obstacle 115b based on the sequence of images received from the at least one optical sensor device 103a-e that has the viewing angle towards the obstacle 115b. The network node 101 then determines navigation information associated with the obstacle 115b based on current or next positions of the subject or the obstacle 115b, or the navigation route 125. The network node 101 sends, to the wireless device 123 over the wireless communication channel, navigation information associated with the obstacle 115b such as an indication associated with warning of a hazardous spill. Further, the navigation information may include information associated with a subject avoiding the obstacle 115b such as an indication to stop, start, turn, yield, increase or reduce gait or speed, or the like. In addition, the navigation information may include information specific to the obstacle 115b such as a type of obstacle (e.g., person, shopping kart, retail display, pallet, hazardous spill).

While the certain subject is at or approaching position 121d, the network node 101 detects that the subject is at or approaching the retail item 117 based on the current position 121d of the subject, the navigation route 125, or a sequence of images received from at least one optical sensor device 103a-e that has a viewing angle towards the retail item 117 and the subject at position 121d. In response, the network node 101 determines navigation information associated with the three-dimensional spatial relationship between the subject at position 121d and the position of the retail item 117 on the retail shelf 113b based on a sequence of images received from at least one optical sensor device 103a-e that has a viewing angle towards the retail item 117 and the subject at position 121d. The network node 101 then sends, to the wireless device 123 over the wireless communication channel, navigation information associated with three dimensional spatial relationship between the subject at position 121d and the position of the retail item 117 on the retail shelf 113b such as an indication associated with directing the subject's hand towards the retail item 117. In some implementations, the network node 101 can utilize a sequence of images received from at least one optical sensor device 103a-e, sensor data of the wireless device 123, the like or combination thereof, to determine whether the subject 121 has fallen/tripped and send a notification to personnel to assist the subject 121.

The network node 101 may be a desktop computer, a computer server, and edge server, or any other computer system known in the art. In some implementations, the network node 101 represents computer systems utilizing clustered computers and components (e.g., database server computers, application server computers, etc.), which act as a single pool of seamless resources. In general, the network node 101 is representative of any electronic device or combination of electronic devices capable of executing computer readable program instructions. The network node 101 may include components as depicted and described in further detail with respect to FIG. 5, in accordance with embodiments of the present disclosure. The network node 101 is configured to provide navigation information, which may include the route 125, to the wireless device 123 using sensor data (e.g., images, device parameters, etc.) of the optical sensor device 103a-e and/or information associated with the wireless device 123. Additionally, the network node 101 is configured to provide supplemental navigational information to the wireless device 123 based on dynamic obstacles (e.g., other subjects, objects, hazards, etc.) within the environment 100 that are probable to prohibit the subject associated with the wireless device 123 to traverse the route 125 without incident. In some implementations, the wireless device 123 may be configured to provide navigation information to a subject associated with the wireless device 123 using sensor data (e.g., images, device parameters, etc.) of the optical sensor device 103a-e and/or information associated with the wireless device 123 and the subject. Additionally, the wireless device 123 may also be configured to provide supplemental navigational information to the subject associated with the wireless device 123 based on dynamic obstacles 115a within the environment 100.

In some implementations, the network 143a and the network 143b (hereinafter, the network) may be one or more wired or wireless communication networks. Portions of the network may be implemented using a wide area network (WAN), such as the Internet, a local area network (LAN), such as a Bluetooth™ network or Wi-Fi™, and combinations or derivatives thereof. In some implementations, the functionality described herein as being performed by the network node 101 is performed via a set of servers in a distributed or cloud-computing environment. In some implementations, the wireless device 123 may communicate with the network node 101 over a dedicated communication channel (as compared to a network). Also, in some implementations, the components illustrated in the environment 100 may communicate through one or more intermediary devices not illustrated in FIG. 1.

Figure 2A:
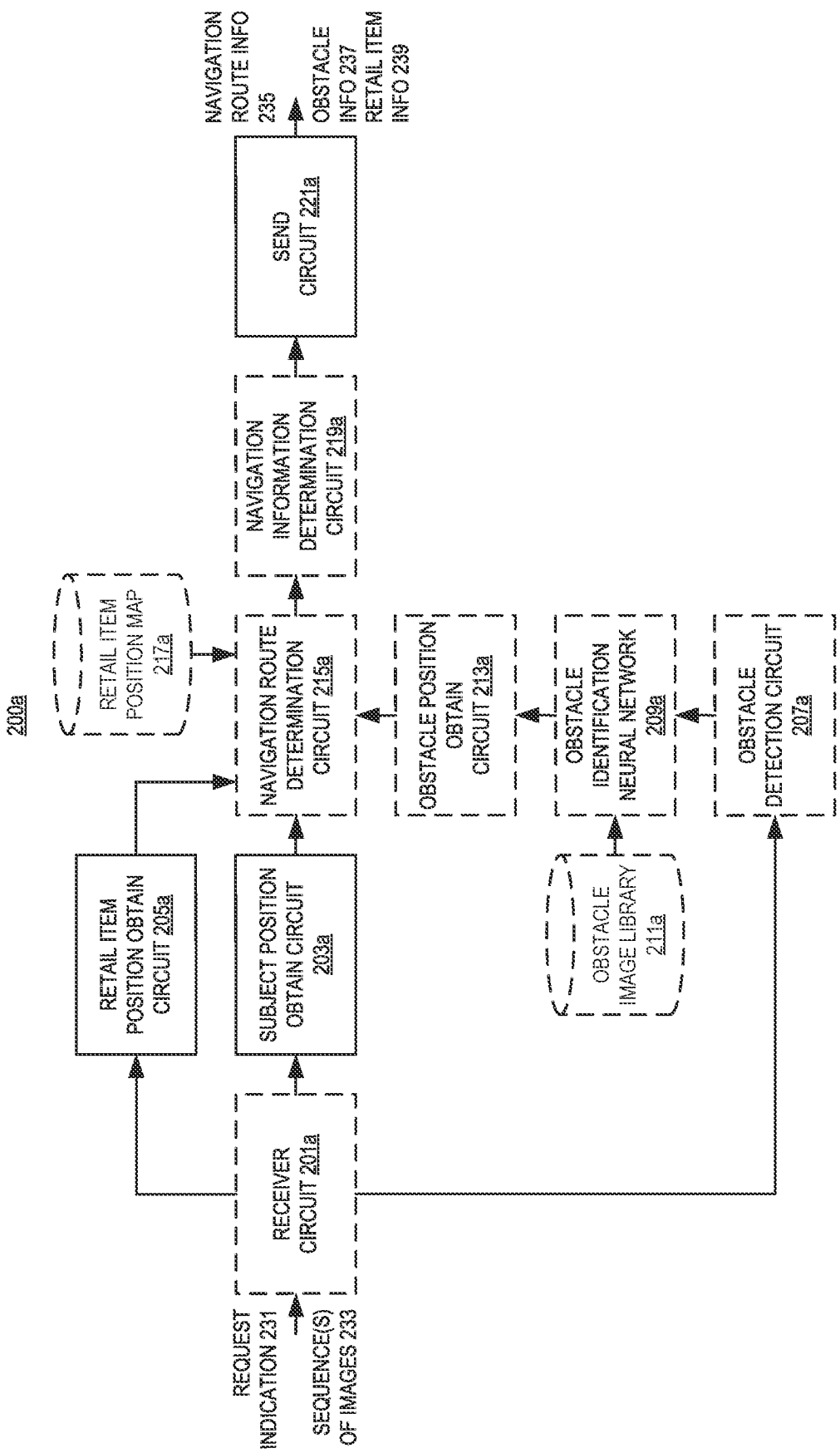
FIG. 2A illustrates one embodiment of a network node in accordance with various aspects as described herein.
Figure 2B:
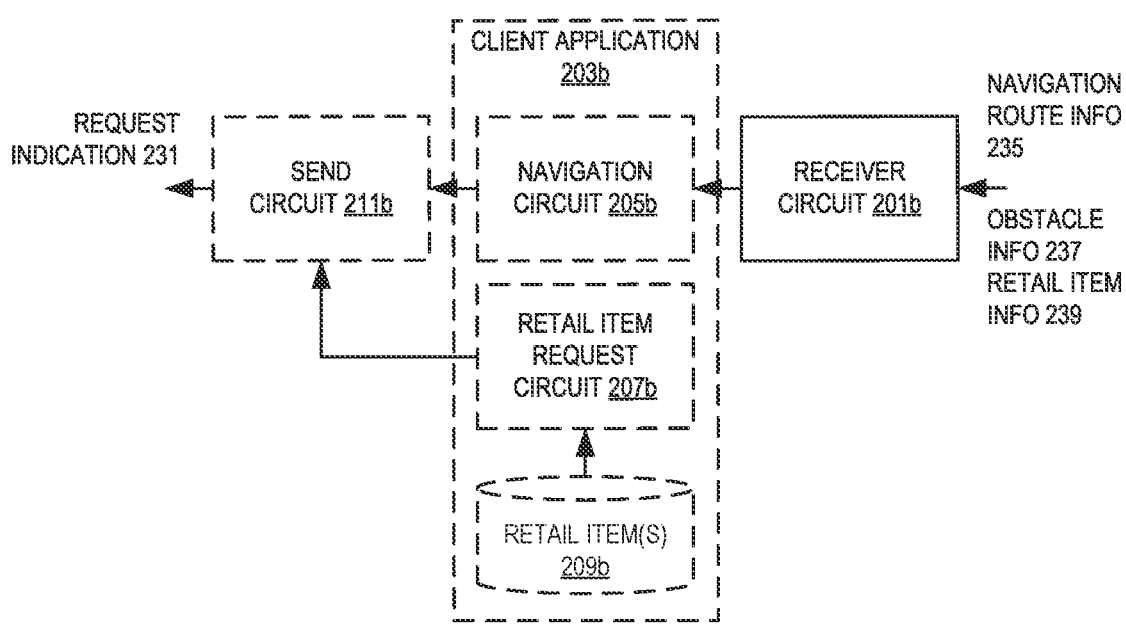
FIG. 2B illustrates one embodiment of a wireless device in accordance with various aspects as described herein.

FIGS. 2A-B illustrate embodiments of a network node 200a and a wireless device 200b, respectively, in accordance with various aspects as described herein. In FIG. 2A, the network node 200a implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) herein) may include for instance: a receiver circuit 201a operable to receive, from the wireless device 200b, an indication 231 that includes a request associated with navigation information and/or receive, from an optical sensor device, sequences of images 233 associated with a retail space; a subject position obtain circuit 203a operable to obtain a current position of a subject in the retail space; a retail item position obtain circuit 205a operable to obtain a current position of a retail item in the retail space; an obstacle detection circuit 207a operable to detect an obstacle in the retail space; an obstacle identification neural network 209a operable to identify the detected obstacle in the retail space based on a sequence of images and an obstacle image library 211a; an obstacle position obtain circuit 213a operable to obtain a current position of the detected obstacle in the retail space; a navigation route determination circuit 215a operable to determine a navigation route in the retail space from the current position of the certain subject to the current position of the retail item based on a retail item position map 217a; a navigation information determination circuit 219a operable to determine navigation information associated with the obstacles in the retail space based on current or next positions of the certain subject or the obstacle, or the navigation route; and a send circuit 221a operable to send, to the wireless device 200b over a wireless communication channel, navigation information 235 associated with the navigation route, navigation information 237 associated with the obstacle, or information 239 associated with the retail item.

In FIG. 2B, the device 200b implements various functional means, units, or modules (e.g., via the processing circuitry 301c in FIG. 3C, via the processing circuitry 501 in FIG. 5, via software code, or the like), or circuits. In one embodiment, these functional means, units, modules, or circuits (e.g., for implementing the method(s) herein) may include for instance: a receiver circuit 201b operable to receive, from the network node 200a, over a wireless communication channel, navigation information 235 associated with a navigation route in the retail space, navigation information 237 associated with an obstacle in the retail space, and/or information 239 associated with a retail item; a client application 203b operable to perform any of the functions described herein; a navigation circuit 205b operable to determine a current position of a subject and provide navigation information to that subject; a retail item request circuit 207b operable to request navigation information based on a retail item; and a send circuit 211b operable to send, to the network node 200a, an indication that includes a request associated with navigation information.

FIGS. 3A-B illustrate embodiments of a network node 300a-b in accordance with various aspects as described herein. In FIG. 3A, the device 300a may include processing circuitry 301a that is operably coupled to one or more of the following: memory 303a and network communications circuitry 305a. The network communication circuitry 305a is configured to transmit and/or receive information to and/or from one or more other network nodes over a network via any communication technology. The processing circuitry 301a is configured to perform processing described herein, such as by executing instructions and accessing information stored in the memory 303a. The processing circuitry 303a in this regard may implement certain functional means, units, or modules.

Figure 5:
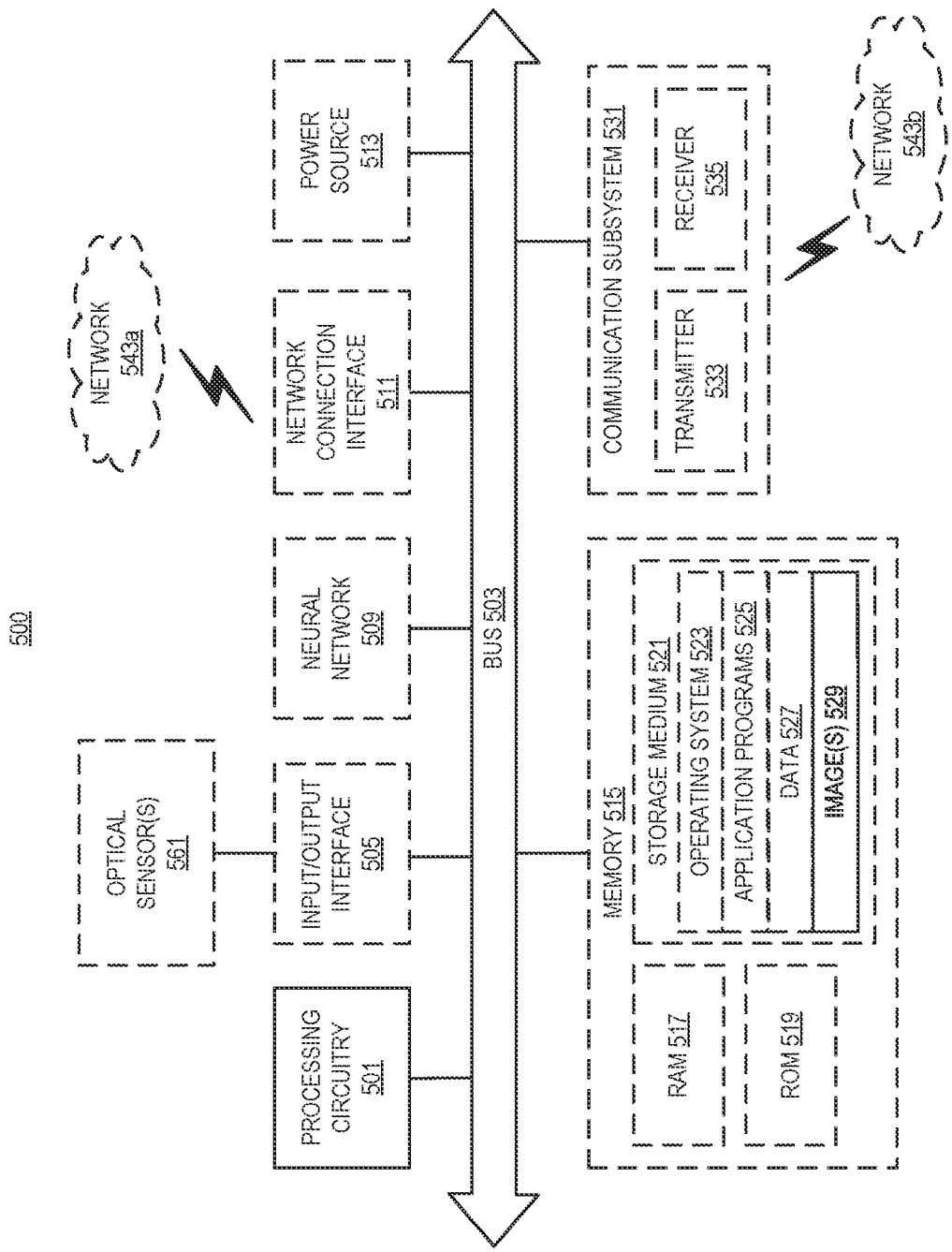
FIG. 5 illustrates another embodiment of an electronic node device in accordance with various aspects as described herein.

In FIG. 3B, the device 300b implements various functional means, units, or modules (e.g., via the processing circuitry 301a in FIG. 3A, via the processing circuitry 501 in FIG. 5, via software code, or the like). In one embodiment, these functional means, units, or modules (e.g., for implementing the method(s) described herein) may include for instance: a receiving module 311b for receiving, from a wireless device, an indication that includes a request associated with navigation information and/or receive, from a set of optical sensor devices, sequences of images associated with a retail space; a retail item position obtaining module 313b for obtaining obtain a current position of a retail item in the retail space; a subject position obtaining module 315b for obtaining a current position of a certain subject in the retail space; an obstacle detecting module 317b for detecting an obstacle in the retail space; an obstacle identifying module 317b for identifying the detected obstacle in the retail space; an obstacle position obtaining module 317b for obtaining a current position of the detected obstacle in the retail space; a navigation route determining module 319b for determining a navigation route in the retail space from the current position of the certain subject to the current position of the retail item; a navigation info determining module 321b navigation information associated with the obstacles in the retail space; and a sending module 323b for sending navigation information associated with the obstacle in the retail space or information associated with a retail item.

Figure 3C:
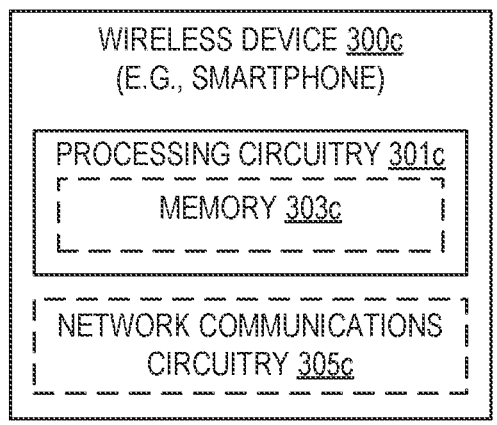
FIGS. 3C-D illustrate other embodiments of a wireless device in accordance with various aspects as described herein.
Figure 3D:
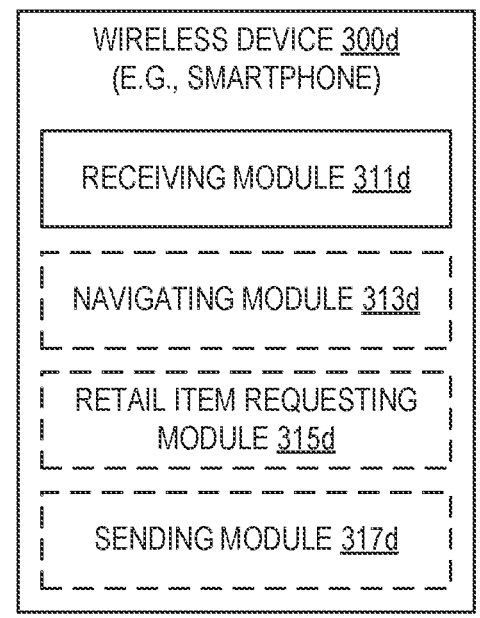

FIGS. 3C-D illustrate embodiments of a wireless device 300c-d in accordance with various aspects as described herein. In FIG. 3C, the device 300c may include processing circuitry 301c that is operably coupled to one or more of the following: memory 303c and network communications circuitry 305c. The network communication circuitry 305c is configured to transmit and/or receive information to and/or from one or more other network nodes over a network via any communication technology. The processing circuitry 301c is configured to perform processing described herein, such as by executing instructions and accessing information stored in the memory 303c. The processing circuitry 303c in this regard may implement certain functional means, units, or modules.

In FIG. 3D, the device 300d implements various functional means, units, or modules (e.g., via the processing circuitry 301c in FIG. 3C, via the processing circuitry 501 in FIG. 5, via software code, or the like). In one embodiment, these functional means, units, or modules (e.g., for implementing the method(s) described herein) may include for instance: a receiving module 311d for receiving, from a network node, navigation information associated with a navigation route from a current position of a certain subject associated with the device 300d in a retail space to a current position of a certain retail item in the retail space, navigation information associated with an obstacle in the retail space, and/or information associated with the certain retail item; a navigating module 313d for determining a current position of the certain subject and providing navigation information to the certain subject; a retail item requesting module 315d for requesting navigation information associated with the certain retail item in the retail space; and a sending module 317d for sending, to the network node, an indication that includes a request associated with navigation information associated with the certain retail item in the retail space.

Figure 4A:
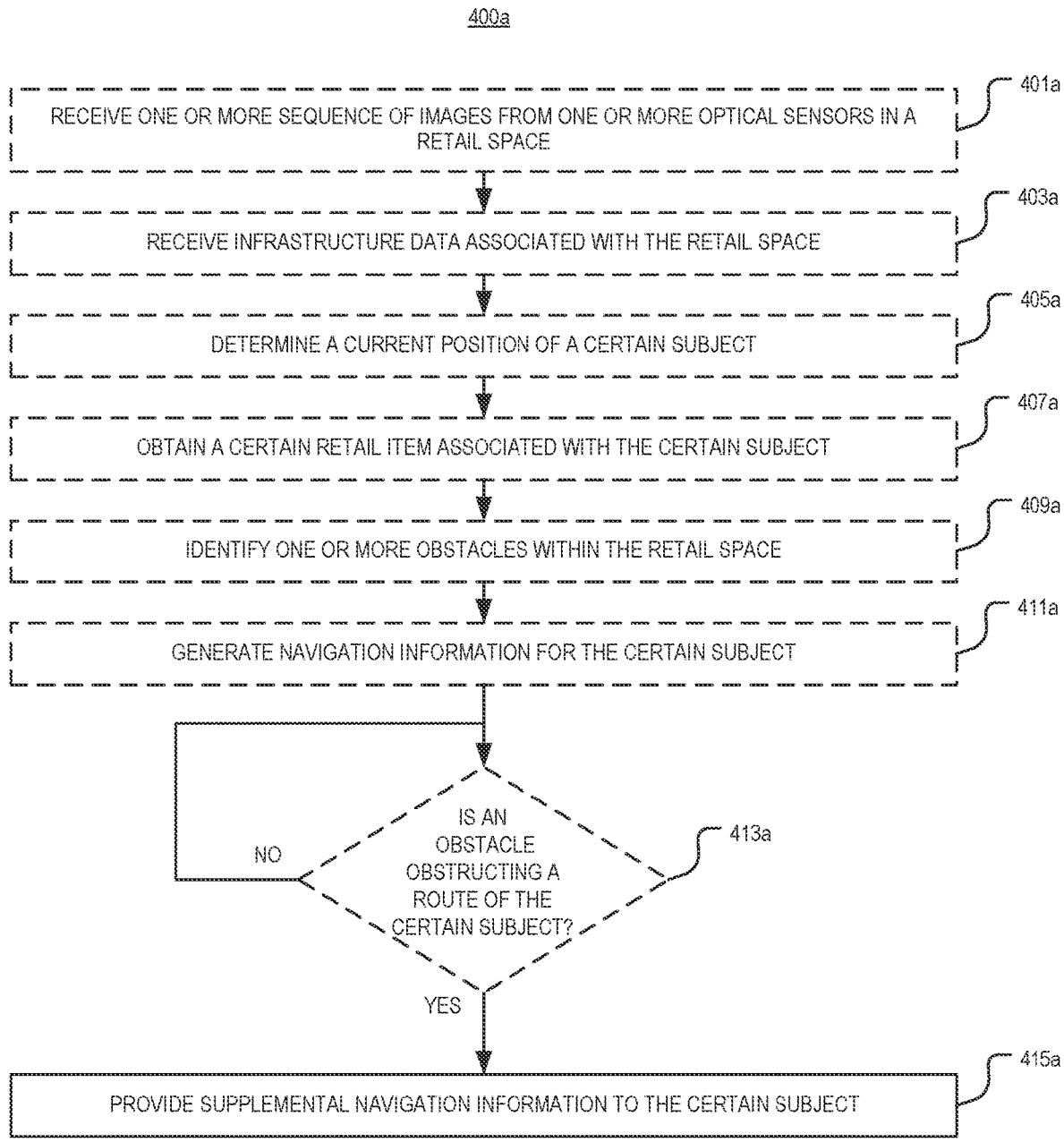
FIG. 4A illustrates one embodiment of a method of providing navigation information associated with a retail space in accordance with various aspects as described herein.

FIG. 4A illustrates one embodiment of a method 400a of providing navigation information associated with a retail space based on a current position of a certain subject and a current position of an obstacle in the retail space in accordance with various aspects as described herein. In FIG. 4A, the method 400a is explained in terms of elements of a retail environment, and in particular a network node. However, it should be understood that portions of the method 400a may be distributed among multiple devices. At block 401a, the method 400a may include receiving one or more sequence of images from one or more optical sensor devices in a retail space. For example, the network node receives one or more sequences of images associated with the environment from optical sensor devices over the network.

At block 403a, the method 400a may include receiving infrastructure data associated with the retail space. For example, the network node receives the infrastructure data associated with the environment from a database (not shown) operationally coupled to the network node. The infrastructure data may also include a predetermined layout (e.g., floor plan) associated with the environment. Additionally, the infrastructure data may also include a location of retail items in the retail space.

At block 405a, the method 400a may include determining a current position of a certain subject. For example, the network node may utilize the one or more sequence of images and camera parameters (e.g., focal length, zoom level, sensor size, etc.) from the optical sensor devices to determine the current position of the certain subject. Additionally, the network node may receive over the network location data (e.g., GPS data) from the wireless device, which is associated with the certain subject and linked to the network node via a client application executable on the wireless device.

At block 407a, the method 400a may include obtaining a certain retail item associated with the certain subject. For example, the network node utilizes the wireless device to obtain the certain retail item associated with the certain subject. The certain retail item may be associated with a list of retail items stored in memory of the wireless device accessible by the network node through the client application. In some implementations, the network node receives an indication from the wireless device that includes a request for the certain item.

At block 409a, the method 400a may include identifying one or more obstacles within the retail space. For example, the network node can utilize the infrastructure data and/or the one or more sequence of images of the optical sensor devices to identify one or more obstacles in the environment. The one or more obstacles may include a subject, an object, or a hazard in the retail space that may hinder or prohibit the certain subject associated with the wireless device from safely traversing the navigation route to the certain retail item. Additionally, a location of the one or more obstacles may vary over time due to the dynamic nature of an obstacle or interactions that move the obstacle from an assigned location of a predetermined layout associated with of the environment. In some implementations, the network node utilizes the infrastructure data associated with the environment and the one or more sequence of images of the optical sensor devices to detect, identify, and locate (e.g., obtain a position) obstacles. Additionally, in some implementations, the network node may utilize an output of a neural network trained using labelled images associated with identified obstacles to determine the presence of obstacles in the environment using the one or more sequence of images of the optical sensor devices.

At block 411a, the method 400a may include generating navigation information for the certain subject. For example, the network node may utilize the one or more sequence of images of the optical sensor devices, a current position of the certain subject, a current position of the certain retail item to generate navigation information. The navigation information may include instructions for navigating the environment, the navigation route in the retail space from the current position of the certain subject to the current position of the certain retail item, and additional information associated with the certain subject, the certain retail item, and/or obstacles. In some implementations, the network node utilizes the infrastructure data associated with the environment and the one or more sequence of images of the optical sensor devices to generate navigation information for the certain subject.

At block 413a, the method 400a may include determining whether an obstacle is obstructing the route of the certain subject. An obstructing obstacle includes objects, subjects, or hazards that may block, hinder, impede movement of the certain subject in accordance with the route of the navigation information. In some implementations, the network node utilizes the one or more sequence of images of the optical sensor devices to determine whether an object is within a threshold distance of a future position of the certain subject associated with the route of the navigation information. In some instances, the network node determines that an obstacle is obstructing the route of the certain subject. In those instances, the network node provides additional navigation information to the certain subject via the wireless device. In some instances, the network node determines that an obstacle is not obstructing the route of the certain subject. In those instances, the network node continues to receive the one or more sequence of images from the optical sensor devices associated with the certain subject to track movement of the certain subject and obstacles of the environment.

At block 415a, the method 400a includes providing supplemental navigation information to the certain subject. The supplemental navigation information may include updated instructions for navigating the environment, modifications to the route in the retail space based on dynamic obstacles, and additional information associated with the certain subject or the certain retail item based on a position of the certain subject in the environment. In some implementations, the network node sends an indication to the wireless device over the network that includes the supplemental navigation information.

Figure 4B:
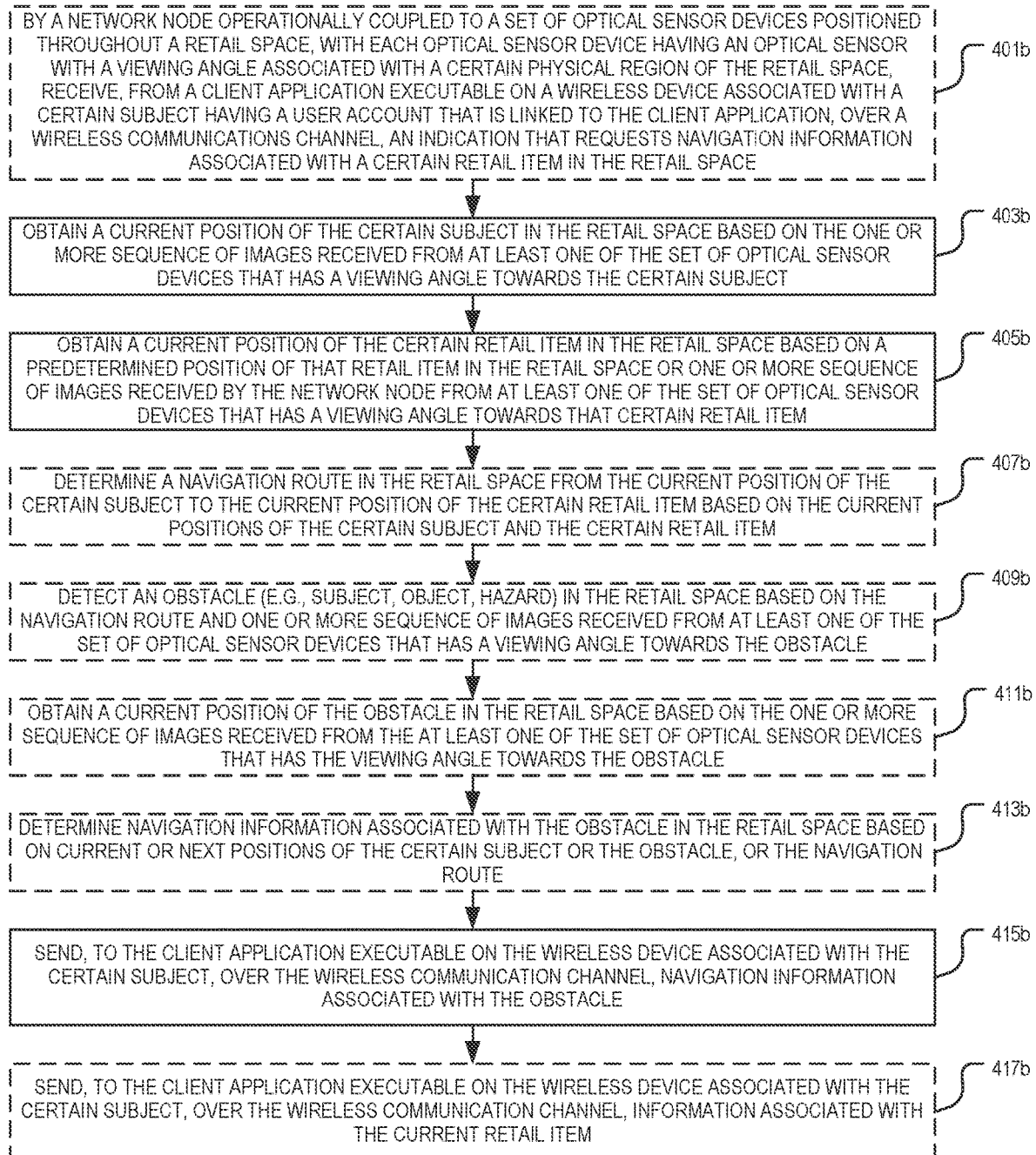
FIG. 4B illustrates another embodiment of a method of providing navigation information associated with a retail space in accordance with various aspects as described herein.

FIG. 4B illustrates one embodiment of a method 400b performed by a network node 101, 200a, 300a-b, 500 of providing navigation information associated with a retail space in accordance with various aspects as described herein. In FIG. 4B, the method 400b may include a network node operationally coupled to a set of optical sensor devices positioned throughout a retail space, with each optical sensor device having an optical sensor with a viewing angle associated with a certain physical region of the retail space. At block 401b, the method 400b includes receiving, from a client application executable on a wireless device associated with a certain subject having a user account that is linked to the client application, over a wireless communications channel, an indication that requests navigation information. The navigation information is associated with a certain retail item in the retail space.

At block 403b, the method 400b includes obtaining a current position of the certain subject in the retail space based on the one or more sequence of images received from at least one of the set of optical sensor devices that has a viewing angle towards the certain subject. At block 405b, the method 400b includes obtaining a current position of the certain retail item in the retail space. The obtaining based on a predetermined position of that retail item in the retail space or one or more sequence of images received by the network node from at least one of the set of optical sensor devices that has a viewing angle towards that certain retail item. At block 407b, the method 400b may include determining a navigation route in the retail space from the current position of the certain subject to the current position of the certain retail item. The determining based on the current positions of the certain subject and the certain retail item.

At block 409b, the method 400b may include detecting an obstacle (e.g., subject, object, hazard) in the retail space. The detecting based on the navigation route and one or more sequence of images received from at least one of the set of optical sensor devices that has a viewing angle towards the obstacle. At block 411b, the method 400b may include obtaining a current position of the obstacle in the retail space. The obtaining based on the one or more sequence of images received from the at least one of the set of optical sensor devices that has the viewing angle towards the obstacle. At block 413b, the method 400b may include determining navigation information associated with the obstacle in the retail space. The determining based on current or next positions of the certain subject or the obstacle, or the navigation route. At block 415b, the method 400b includes sending to the client application executable on the wireless device associated with the certain subject, over the wireless communication channel, navigation information associated with the obstacle. At block 417b, the method 400b may include sending to the client application executable on the wireless device associated with the certain subject, over the wireless communication channel, information associated with the current retail item.

Figure 4C:
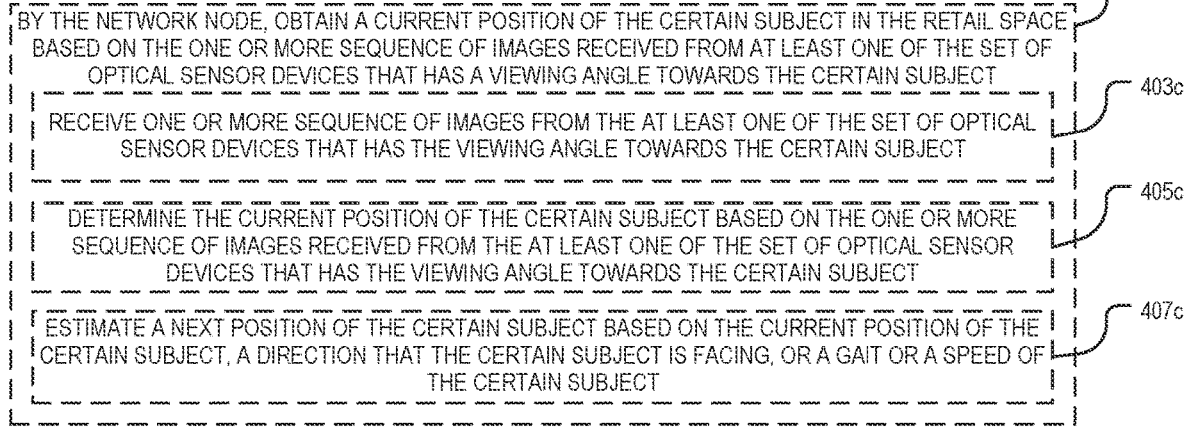
FIG. 4C illustrates one embodiment of a method of obtaining a current position of the certain subject in a retail space in accordance with various aspects as described herein.

FIG. 4C illustrates one embodiment of a method 400c performed by a network node 101, 200a, 300a-b, 500 of obtaining a current position of the certain subject in a retail space in accordance with various aspects as described herein. In FIG. 4C, the method 400c may include a network node operationally coupled to a set of optical sensor devices positioned throughout a retail space, with each optical sensor device having an optical sensor with a viewing angle associated with a certain physical region of the retail space. At block 401c, obtaining a current position of the certain subject in the retail space. The obtaining based on the one or more sequence of images received from at least one of the set of optical sensor devices that has a viewing angle towards the certain subject. Also, at block 403c, the method 400c may include receiving one or more sequence of images from the at least one of the set of optical sensor devices that has the viewing angle towards the certain subject. In addition, at block 405c, the method 400c may include determining the current position of the certain subject. The determining based on the one or more sequence of images received from the at least one of the set of optical sensor devices that has the viewing angle towards the certain subject. Also, at block 407c, the method 400c may include estimating a next position of the certain subject. The estimating based on the current position of the certain subject, a direction that the certain subject is facing, or a gait or a speed of the certain subject.

Figure 4D:
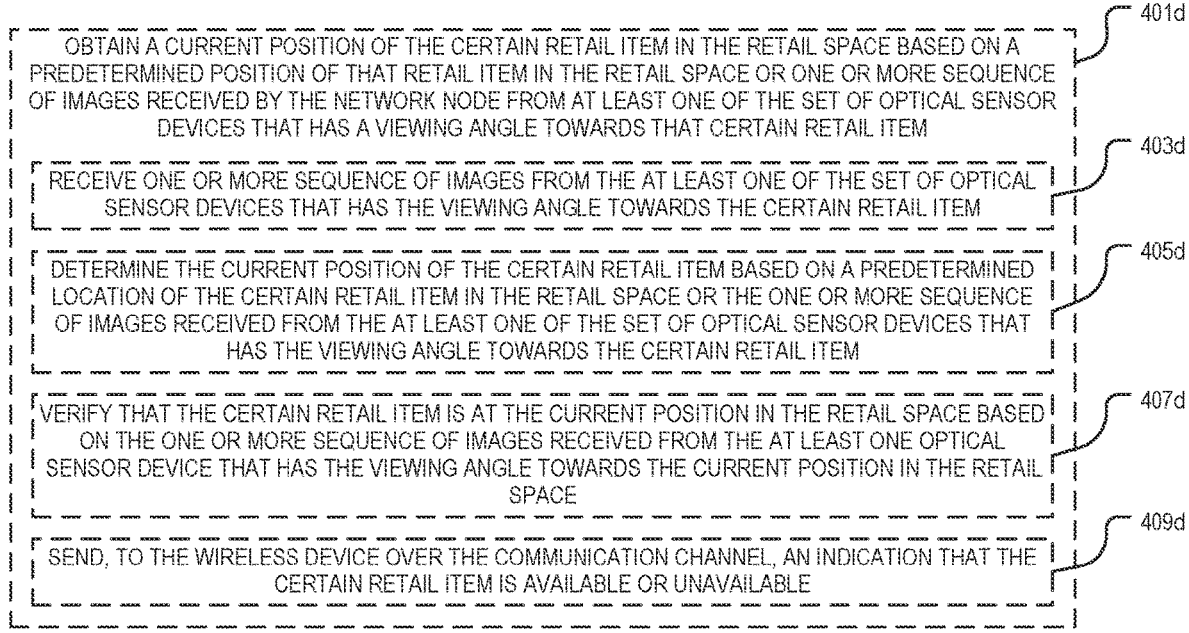
FIG. 4D illustrates one embodiment of a method of obtaining a current position of the certain retail item in the retail space in accordance with various aspects as described herein.

FIG. 4D illustrates one embodiment of a method 400d performed by a network node 101, 200a, 300a-b, 500 of obtaining a current position of the certain retail item in the retail space in accordance with various aspects as described herein. In FIG. 4D, the method 400d may include a network node operationally coupled to a set of optical sensor devices positioned throughout a retail space, with each optical sensor device having an optical sensor with a viewing angle associated with a certain physical region of the retail space. At block 401d, obtaining a current position of the certain retail item in the retail space. The obtaining based on a predetermined position of that retail item in the retail space or one or more sequence of images received by the network node from at least one of the set of optical sensor devices that has a viewing angle towards that certain retail item. Also, at block 403d, the method 400d may include receiving one or more sequence of images from the at least one of the set of optical sensor devices that has the viewing angle towards the certain retail item. In addition, at block 405d, the method 400d determining the current position of the certain retail item. The determining based on a predetermined location of the certain retail item in the retail space or the one or more sequence of images received from the at least one of the set of optical sensor devices that has the viewing angle towards the certain retail item. Additionally, at block 407d, the method 400d may include verifying that the certain retail item is at the current position in the retail space. The verifying based on the one or more sequence of images received from the at least one optical sensor device that has the viewing angle towards the current position in the retail space. Also, at block 409d, the method 400d may include sending to the wireless device over the communication channel, an indication that the certain retail item is available or unavailable.

Figure 4E:
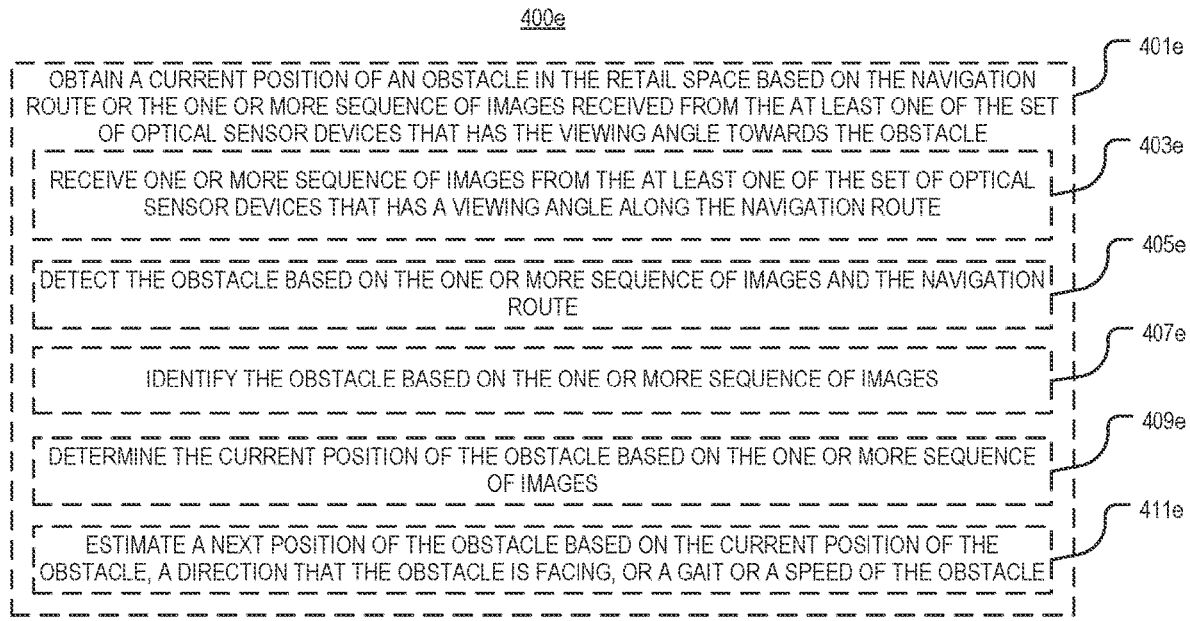
FIG. 4E illustrates one embodiment of a method of obtaining a current position of an obstacle in the retail space in accordance with various aspects as described herein.

FIG. 4E illustrates one embodiment of a method 400e performed by a network node 101, 200a, 300a-b, 500 of obtaining a current position of an obstacle in the retail space in accordance with various aspects as described herein. In FIG. 4E, the method 400e may include a network node operationally coupled to a set of optical sensor devices positioned throughout a retail space, with each optical sensor device having an optical sensor with a viewing angle associated with a certain physical region of the retail space. At block 401e, obtaining a current position of an obstacle in the retail space. The obtaining based on the one or more sequence of images received from the at least one of the set of optical sensor devices that has the viewing angle towards the obstacle. Also, at block 403e, the method 400e may include receiving one or more sequence of images from the at least one of the set of optical sensor devices that has the viewing angle along the navigation route. In addition, at block 405e, the method 400e detecting the obstacle. The detecting based on the one or more sequence of images and the navigation route. Additionally, at block 407e, the method 400e may include identifying the obstacle. The identifying based on the one or more sequence of images. Also, at block 409e, the method 400e may include determining the current position of the obstacle. The determining based on the one or more sequence of images. Additionally, at block 411e, the method 400e may include estimating a next position of the obstacle. The estimation based on the current position of the obstacle, a direction that the obstacle is facing, or a gait or a speed of the obstacles.

Figure 4F:
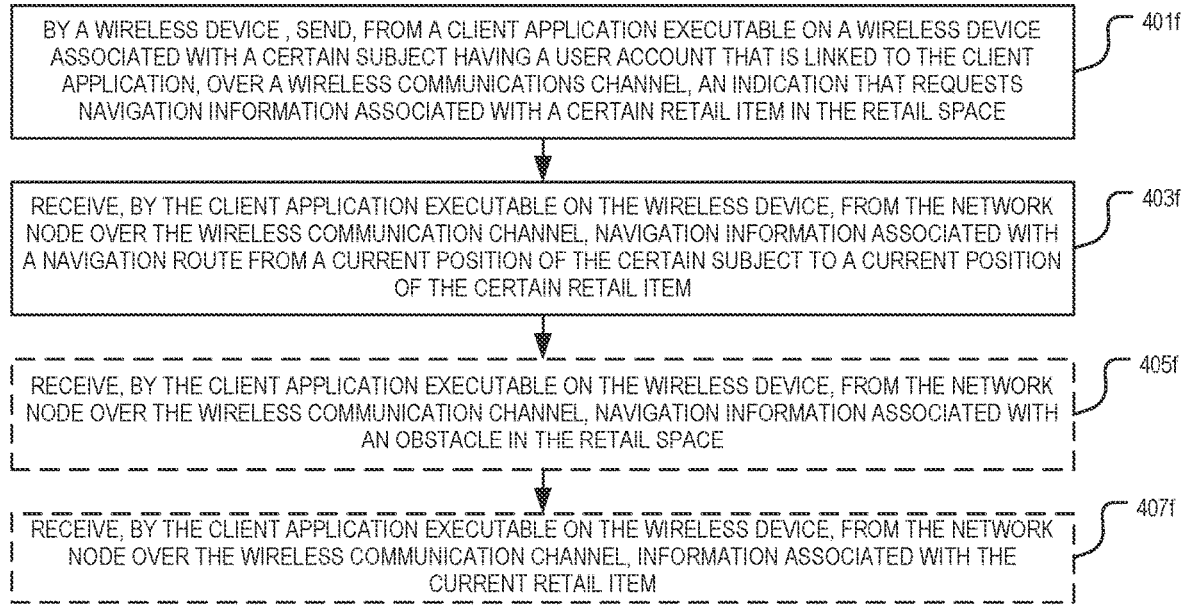
FIG. 4F illustrates one embodiment of a method of providing navigation information associated with a retail space in accordance with various aspects as described herein.

FIG. 4F illustrates one embodiment of a method 400f performed by a wireless device 141, 200b, 300c-d, 500 of providing navigation information associated with a retail space in accordance with various aspects as described herein. In FIG. 4F, the method 400f may include a wireless device operationally coupled to a network node that is also operationally coupled to a set of optical sensor devices positioned throughout a retail space, with each optical sensor device having an optical sensor with a viewing angle associated with a certain physical region of the retail space. At block 401f, the method 400f includes sending, from a client application executable on a wireless device associated with a certain subject having a user account that is linked to the client application, over a wireless communications channel, an indication that requests navigation information associated with a certain retail item in the retail space.

At block 403f, the method 400f includes receiving, by the client application executable on the wireless device, from the network node over the wireless communication channel, navigation information associated with a navigation route from a current position of the certain subject to a current position of the certain retail item. At block 405f, the method 400f may include receiving, by the client application executable on the wireless device, from the network node over the wireless communication channel, navigation information associated with an obstacle in the retail space. At block 407f, the method 400f includes receiving, by the client application executable on the wireless device, from the network node over the wireless communication channel, information associated with the current retail item.

FIG. 5 illustrates another embodiment of a device 500 (e.g., network node, wireless device, optical sensor device)

in accordance with various aspects as described herein. In FIG. 5, the device 500 includes processing circuitry 501 that is operatively coupled to input/output interface 505, neural network circuit 509, network connection interface 511, power source 513, memory 515 including random access memory (RAM) 517, read-only memory (ROM) 519, and storage medium 521 or the like, communication subsystem 531, transmitter 533, receiver 535, optical sensor(s) 561, and/or any other component, or any combination thereof. Storage medium 521 includes operating system 523, application program 525, data 527, and image(s) 529. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. The device 500 may be configured to use an input device (e.g., the optical sensor(s) 561) via input/output interface 505 to the image(s) 529 and device parameters (not shown). The device 500 may be configured to use an output device via input/output interface 505. An output device may use the same type of interface port as an input device. For example, a USB port may be used to provide input to and output from the device 500. The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5, the neural network 509 may be configured to learn to perform tasks by considering examples. The network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as a widget or gadget engine or another application, a data file 527, time stamped message(s) 529, and simulation object(s) 530. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500 to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

In FIG. 5, the processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the device 500.

The features, benefits and/or functions described herein may be implemented in one of the components of the device 500 or partitioned across multiple components of the device 500. Further, the features, benefits, and/or functions described herein may be implemented in any combination of hardware, software or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method comprises, by a network node operationally coupled to a set of optical sensor devices positioned throughout a retail space, with each optical sensor device having an optical sensor with a viewing angle associated with a certain physical region of the retail space, the network node being enabled to receive a sequence of images from each optical sensor device so as to determine positions of subjects represented in the sequences of images, with each sequence of images corresponding to the different physical regions of the retail space, with each subject being associated with a user account that is linked to a client application executable on a wireless device. Also, the method comprises, obtaining a current position of a certain subject in the retail space based on one or more sequence of images received from at least one optical sensor device that has a viewing angle towards the certain subject. Additionally, the method comprises, obtaining a current position of an obstacle in the retail space based on one or more sequence of images received from at least one optical sensor device that has a viewing angle towards the obstacle. In addition, the method comprises, sending, by the network node, to a client application executable on a wireless device associated with the certain subject, navigation information associated with the current positions of the certain subject and the obstacle in the retail space.

In another exemplary embodiment, the step of sending the navigation information is contemporaneous with the steps of obtaining the current positions of the certain subject and the obstacle. The term "contemporaneous" is defined as occurring in the same period of time as understood by one of ordinary skill in the art, and in one non-limiting embodiment the term is defined to be within one hundred milliseconds, in another embodiment within five hundred milliseconds, in another embodiment within one second, and in another embodiment within two seconds.

In another exemplary embodiment, the method further includes detecting the obstacle based on one or more sequence of images received from at least one of the set of optical sensor devices that has a viewing angle towards the obstacle in the retail space.

In another exemplary embodiment, the method further includes identifying the obstacle based on the one or more sequence of images received from at least one of the set of optical sensor devices that has a viewing angle towards the obstacle.

In another exemplary embodiment, the method further includes identifying the obstacle by selecting at least one of a set of obstacles predicted by a neural network from the one or more sequence of images received from the at least one of the set of optical sensor devices that has the viewing angle towards the obstacle, with the neural network being trained by a set of training images of the set of obstacles.

In another exemplary embodiment, the method further includes selecting at least one of a set of obstacles predicted by a neural network by sending, to the neural network, the one or more sequence of images received from the at least one of the set of optical sensor devices that has the viewing angle towards the obstacle. Additionally, the method comprises, receiving, from the neural network, for each image, an indication of at least one predicted obstacle of the set of obstacles and a corresponding confidence level. In addition, the method comprises, wherein the selecting is based on the at least one predicted obstacle and the corresponding confidence level.

In another exemplary embodiment, the method further includes selecting by selecting the at least one predicted obstacle that has a confidence level above a predetermined confidence threshold.

In another exemplary embodiment, the method further includes estimating a next position of the certain subject based on the current position of the certain subject, a direction that the certain subject is facing or moving, or a gait or speed of the certain subject. Additionally, the method comprises, wherein the navigation information is further associated with the estimated next position of the certain subject.

In another exemplary embodiment, the method further includes estimating a next position of the obstacle based on the current position of the obstacle, a direction that the obstacle is facing or moving, or a gait or speed of the obstacle. Additionally, the method comprises, wherein the navigation information is further associated with the estimated next position of the obstacle.

In another exemplary embodiment, the method further includes receiving, by the network node, from the client application executable on the wireless device, an indication that requests navigation information associated with a certain retail item in the retail space. Additionally, the method comprises, obtaining a current position of the certain retail item based on a predetermined layout of retail items in the retail space. In addition, the method comprises, determining a navigation route in the retail space from the current position of the certain subject to the current position of the certain retail item based on the current positions of the certain subject, the certain retail item, and the obstacle.

In another exemplary embodiment, the method further includes obtaining the current position of the certain retail item by receiving, by the network node, from at least one of the set of optical sensor devices that has a viewing angle towards the certain retail item in the retail space, one or more sequence of images associated with the certain retail item. Additionally, the method comprises, verifying that the certain retail item is at the current position based on the one or more sequence of images associated with the retail item.

In another exemplary embodiment, the method further includes obtaining information associated with the retail item. Additionally, the method comprises, sending, by the network node, to the client application executable on the wireless device, the information associated with the retail item.

In another exemplary embodiment, the method further includes sending, by the network node, to the client application executable on the wireless device, navigation information associated with the current positions of the certain subject, the obstacle, and the certain retail item in the retail space.

In another exemplary embodiment, the method further includes wherein the navigation information is associated with audio or haptic feedback generated by the wireless device.

In another exemplary embodiment, the method further includes wherein the obstacle is a subject, an object, or a hazard.

In one exemplary embodiment, a network node, comprising: a processor and a memory, the memory containing instructions executable by the processor whereby the processor is configured to determine a current position of a certain subject in a retail space based on one or more sequence of images received from at least one of a set of optical sensor devices that has a viewing angle towards the certain subject, with each optical sensor device having an optical sensor with a viewing angle associated with a certain physical region of the retail space, with each sequence of images corresponding to that certain physical region of the retail space, with each subject being associated with a user account that is linked to a client application executable on a wireless device. Additionally, the processor is configured to determine a current position of an obstacle in the retail space based on one or more sequence of images received from at least one of the set of optical sensor devices that has a viewing angle towards the obstacle. Also, the processor is configured to send to a client application executable on a wireless device associated with the certain subject, navigation information associated with the current positions of the certain subject and the obstacle in the retail space.

In one exemplary embodiment, a method comprises, by a wireless device operationally coupled to a network node that is also operationally coupled to a set of optical sensor devices positioned throughout a retail space, with each optical sensor device having an optical sensor with a viewing angle associated with a certain physical region of the retail space, the network node being enabled to receive a sequence of images from each optical sensor device so as to determine positions of subjects represented in the sequences of images, with each sequence of images corresponding to that different physical region of the retail space, with each subject being associated with a user account that is linked to a client application executable on a wireless device. Additionally, the method comprises, receiving, by a client application executable on the wireless device associated with a certain subject, navigation information associated with current positions of the certain subject and an obstacle in the retail space, wherein the network node is enabled to determine the current position of the certain subject based on one or more sequence of images received from at least one of the set of optical sensor devices that has a viewing angle towards the certain subject and to determine the current position of the obstacle based on one or more sequence of images received from at least one of the set of optical sensor devices that has a viewing angle towards the obstacle.

In another exemplary embodiment, step of receiving the navigation information is contemporaneous with the steps of obtaining the current position of the certain subject and obtaining the current position of the obstacle.

In another exemplary embodiment, the method further includes sending, by the client application executable on the wireless device, to the network node, an indication that requests navigation information associated with a certain retail item in the retail space.

In another exemplary embodiment, the method further includes receiving, by the client application executable on the wireless device, from the network node, the navigation information. Additionally, the method comprises, obtaining a navigation route in the retail space associated with the current positions of the certain subject, the certain obstacle, and the certain retail item based on the navigation information.

In another exemplary embodiment, the method further includes receiving, by the client application executable on the wireless device, from the network node, information related to the certain retail item.

In one exemplary embodiment, a wireless device, comprising: a processor and a memory, the memory containing instructions executable by the processor whereby the processor is configured to: receive, by a client application executable on the wireless device associated with a certain subject having a user account that is linked to the client application, from a network node over a wireless communications channel that is operationally coupled to a set of optical sensor devices positioned throughout a retail space with each optical sensor device having an optical sensor with a viewing angle associated with a certain physical region of the retail space, an indication that provides navigation information associated with the retail space based on a current position of the certain subject in the retail space and a current position of an obstacle in the retail space, wherein the network node is enabled to determine the current position of the certain subject based on one or more sequence of images received from at least one of the set of optical sensor devices that has a viewing angle towards the certain subject and is also enabled to determine the current position of the obstacle based on one or more sequence of images received from at least one of the set of optical sensor devices that has a viewing angle towards the obstacle.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
by a network node operationally coupled to a set of optical sensor devices positioned throughout a retail space, with each optical sensor device having an optical sensor with a viewing angle associated with a certain physical region of the retail space, the network node being enabled to receive a sequence of images from each optical sensor device so as to determine positions of subjects represented in the sequences of images, with each sequence of images corresponding to the different physical regions of the retail space,
obtaining current and next positions of a certain subject while that subject traverses the retail space based on one or more sequence of images received from a first optical sensor device of the set of optical sensor devices that has a viewing angle towards the certain subject;
obtaining current and next positions of a moving obstacle in the retail space based on one or more sequence of images received from a second optical sensor device of the set of optical sensor devices that has a viewing angle towards the obstacle;
sending, by the network node, to a wireless device associated with the certain subject, navigation information associated with the current and next positions of the certain subject and the obstacle in the retail space, with the sending of the navigation information being contemporaneous with the obtaining the current and next positions of the certain subject and the obstacle.

2. The method of claim 1, further comprising:
detecting the obstacle based on the one or more sequence of images received from the second optical sensor device that has the viewing angle towards the obstacle in the retail space.

3. The method of claim 2, further comprising:
identifying the obstacle based on the one or more sequence of images received from the second optical sensor device that has the viewing angle towards the obstacle.

4. The method of claim 3, wherein the identifying step further includes:
selecting at least one of a set of obstacles predicted by a neural network from the one or more sequence of images received from the optical sensor device that has the viewing angle towards the obstacle, with the neural network being trained by a set of training images of the set of obstacles.

5. The method of claim 4, further comprising:
sending, to the neural network, the one or more sequence of images received from the second optical sensor device that has the viewing angle towards the obstacle; and
receiving, from the neural network, for the one or more sequence of images, an indication of at least one predicted obstacle of the set of obstacles and a corresponding confidence level; and
wherein the selecting is based on the at least one predicted obstacle and the corresponding confidence level.

6. The method of claim 5, wherein the selecting includes:
selecting the at least one predicted obstacle that has the corresponding confidence level above a predetermined confidence threshold.

7. The method of claim 1, further comprising:
estimating the next position of the certain subject based on the current position of the certain subject, a direction that the certain subject is facing or moving, or a gait or speed of the certain subject.

8. The method of claim 1, further comprising:
estimating the next position of the obstacle based on the current position of the obstacle, a direction that the obstacle is facing or moving, or a gait or speed of the obstacle.

9. The method of claim 1, further comprising:
receiving, by the network node, from the wireless device, an indication that requests navigation information associated with a certain retail item in the retail space;
obtaining a current position of the certain retail item based on a predetermined layout of retail items in the retail space; and
determining a navigation route in the retail space from the current position of the certain subject to the current position of the certain retail item based on the current positions of the certain subject, the certain retail item, and the obstacle.

10. The method of claim 9, wherein the obtaining the current position of the certain retail item further includes:
receiving, by the network node, from a third optical sensor device of the set of optical sensor devices that has a viewing angle towards the certain retail item in the retail space, one or more sequence of images associated with the certain retail item; and
verifying that the certain retail item is at the current position based on the one or more sequence of images associated with the retail item.

11. The method of claim 9, further comprising:
obtaining information associated with the retail item; and
sending, by the network node, to the wireless device, the information associated with the retail item.

12. The method of claim 9, further comprising:
sending, by the network node, to the wireless device, navigation information associated with the current and next positions of the certain subject and the obstacle and the current position of the certain retail item in the retail space.

13. The method of claim 1, wherein the navigation information is associated with audio or haptic feedback generated by the wireless device.

14. The method of claim 1, wherein the obstacle is a subject, an object, or a hazard.

15. A network node, comprising:
a processor and a memory, the memory containing instructions executable by the processor whereby the processor is configured to:
obtain current and next positions of a certain subject while that subject traverses a retail space based on one or more sequence of images received from a first optical sensor device of a set of optical sensor devices that has a viewing angle towards the certain subject, with each optical sensor device having an optical sensor with a viewing angle associated with a certain physical region of the retail space, with each sequence of images corresponding to that certain physical region of the retail space;
obtain current and next positions of a moving obstacle in the retail space based on one or more sequence of images received from a second optical sensor device of the set of optical sensor devices that has a viewing angle towards the obstacle;
send, by the network node, to a wireless device associated with the certain subject, navigation information associated with the current and next positions of the certain subject and the obstacle in the retail space, with the sending of the navigation information being contemporaneous with the obtaining of the current and next positions of the certain subject and the obstacle.

16. A method, comprising:
by a wireless device associated with a certain subject, with the wireless device being operationally coupled to a network node, the network node being operationally coupled to a set of optical sensor devices positioned throughout a retail space, with each optical sensor device having an optical sensor with a viewing angle associated with a certain physical region of the retail space, the network node being enabled to receive a sequence of images from each optical sensor device so as to determine positions of subjects and obstacles represented in the sequences of images, with each sequence of images corresponding to that different physical region of the retail space,
receiving, by the wireless device, from a network node over a wireless communication channel, navigation information associated with both current and next positions of the certain subject while that subject traverses the retail space and current and next positions of a moving obstacle in the retail space, wherein the network node is enabled to obtain the current and next positions of the certain subject based on one or more sequence of images received from at least one of the set of optical sensor devices that has a viewing angle towards the certain subject and to obtain the current and next positions of the obstacle based on one or more sequence of images received from at least one of the set of optical sensor devices that has a viewing angle towards the obstacle, with the receiving of the navigation information being contemporaneous with the obtaining of the current and next positions of the certain subject and the obstacle.

17. The method of claim 16, further comprising:
sending, by the wireless device, to the network node, an indication that requests navigation information associated with a certain retail item in the retail space.

18. The method of claim 17, further comprising:
receiving, by the wireless device, from the network node, the navigation information;
obtaining a current position of the certain retail item based on a predetermined layout of retail items in the retail space; and
obtaining a navigation route in the retail space associated with the current and next positions of the certain subject and the certain obstacle and the current position of the certain retail item based on the navigation information.

19. The method of claim 17, further comprising:
receiving, by the wireless device, from the network node, information related to the certain retail item.

20. A wireless device, comprising:
a processor and a memory, the memory containing instructions executable by the processor whereby the processor is configured to:
receive, by the wireless device associated with a certain subject, from a network node over a wireless communications channel, an indication that provides navigation information associated with a retail space based on both current and next positions of the certain subject while that subject traverses the retail space and current and next positions of a moving obstacle in the retail space, wherein the network node is operationally coupled to a set of optical sensor devices positioned throughout the retail space, with each optical sensor device having an optical sensor with a viewing angle associated with a certain physical region of the retail space, the network node being enabled to obtain the current and next positions of the certain subject based on one or more sequence of images received from at least one of the set of optical sensor devices that has a viewing angle towards the certain subject and is further enabled to obtain the current and next positions of the obstacle based on one or more sequence of images received from at least one of the set of optical sensor devices that has a viewing angle towards the obstacle, with the receiving of the navigation information being contemporaneous with the obtaining of the current and next positions of the certain subject and the obstacle.

21. The method of claim 9, wherein the sending the navigation information is performed at a predetermined time or distance interval along the navigation route in the retail space.

* * * * *